United States Patent [19]
Mogami

[11] 4,380,375
[45] Apr. 19, 1983

[54] WIDE ANGLE ZOOM LENS OF TWO-GROUP CONSTRUCTION
[75] Inventor: Satoshi Mogami, Kodaira, Japan
[73] Assignee: Nippon Kogaku K. K., Tokyo, Japan
[21] Appl. No.: 153,788
[22] Filed: May 27, 1980
[30] Foreign Application Priority Data
   Jun. 8, 1979 [JP]   Japan ................................ 54-71112
[51] Int. Cl.$^3$ ............................................ G02B 15/14
[52] U.S. Cl. .................................................. 350/426
[58] Field of Search ......................................... 350/426
[56] References Cited
U.S. PATENT DOCUMENTS

| | | | |
|---|---|---|---|
| 4,074,931 | 2/1978 | Okudaira | 350/426 |
| 4,155,629 | 5/1979 | Nakamura | 350/426 |
| 4,266,860 | 5/1981 | Hayashi | 350/426 |

FOREIGN PATENT DOCUMENTS 54-114236  9/1979  Japan ................................... 350/426

*Primary Examiner*—John K. Corbin
*Assistant Examiner*—Scott J. Sugarman
*Attorney, Agent, or Firm*—Shapiro and Shapiro

[57] ABSTRACT

A wide angle zoom lens system comprises a forward group which is a divergent lens group, and a rearward group which is a convergent lens group. The divergent lens group includes, in succession from the object side, at least two negative meniscus lenses having their convex surfaces facing the object side and only one positive meniscus lens having its convex surface facing the object side. The convergent lens group has, in succession from the object side, a biconvex positive lens having its surface of sharper curvature facing the object side, a single or doublet positive lens having its surface of sharper curvature facing the object side, a biconcave negative lens having its surface of sharper curvature facing the image side, a positive meniscus lens having its convex surface facing the image side, and a positive meniscus lens having its convex surface facing the object side. The lens system satisfies predetermined conditions.

4 Claims, 20 Drawing Figures

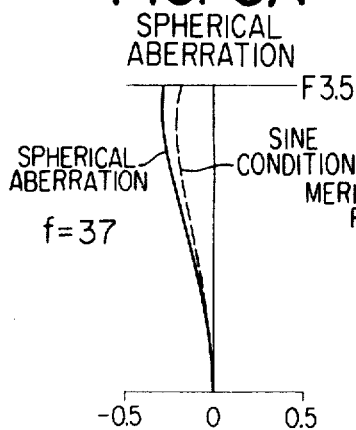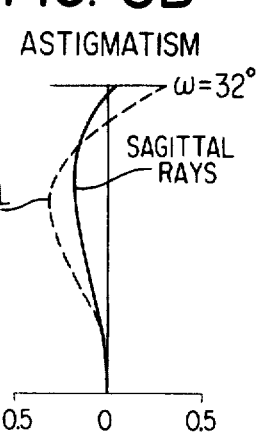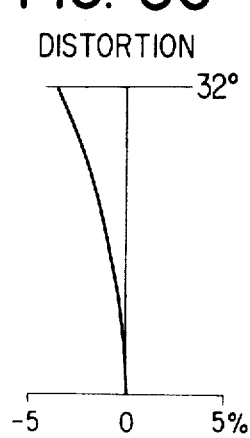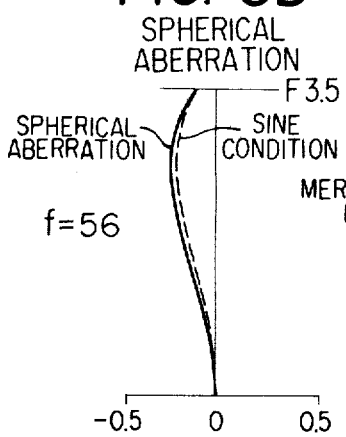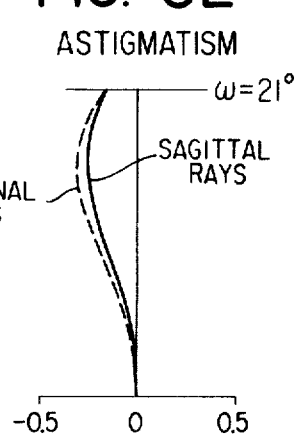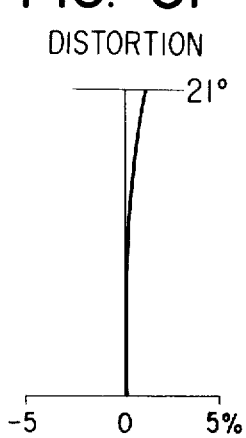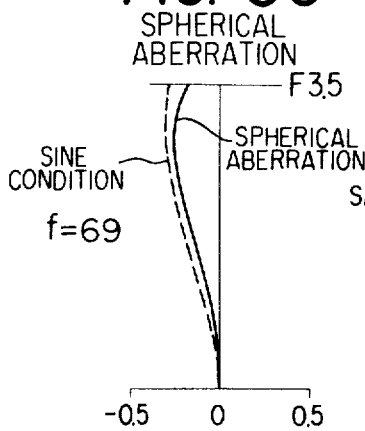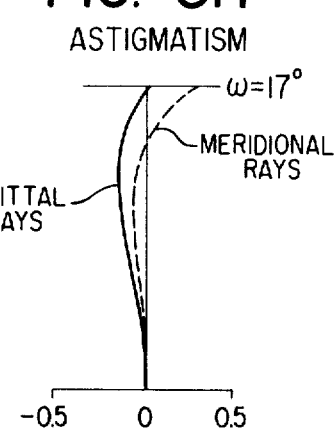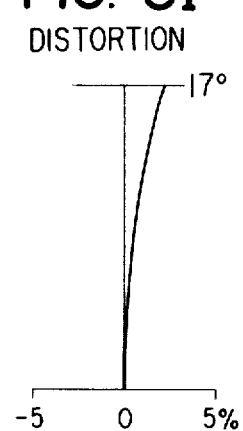

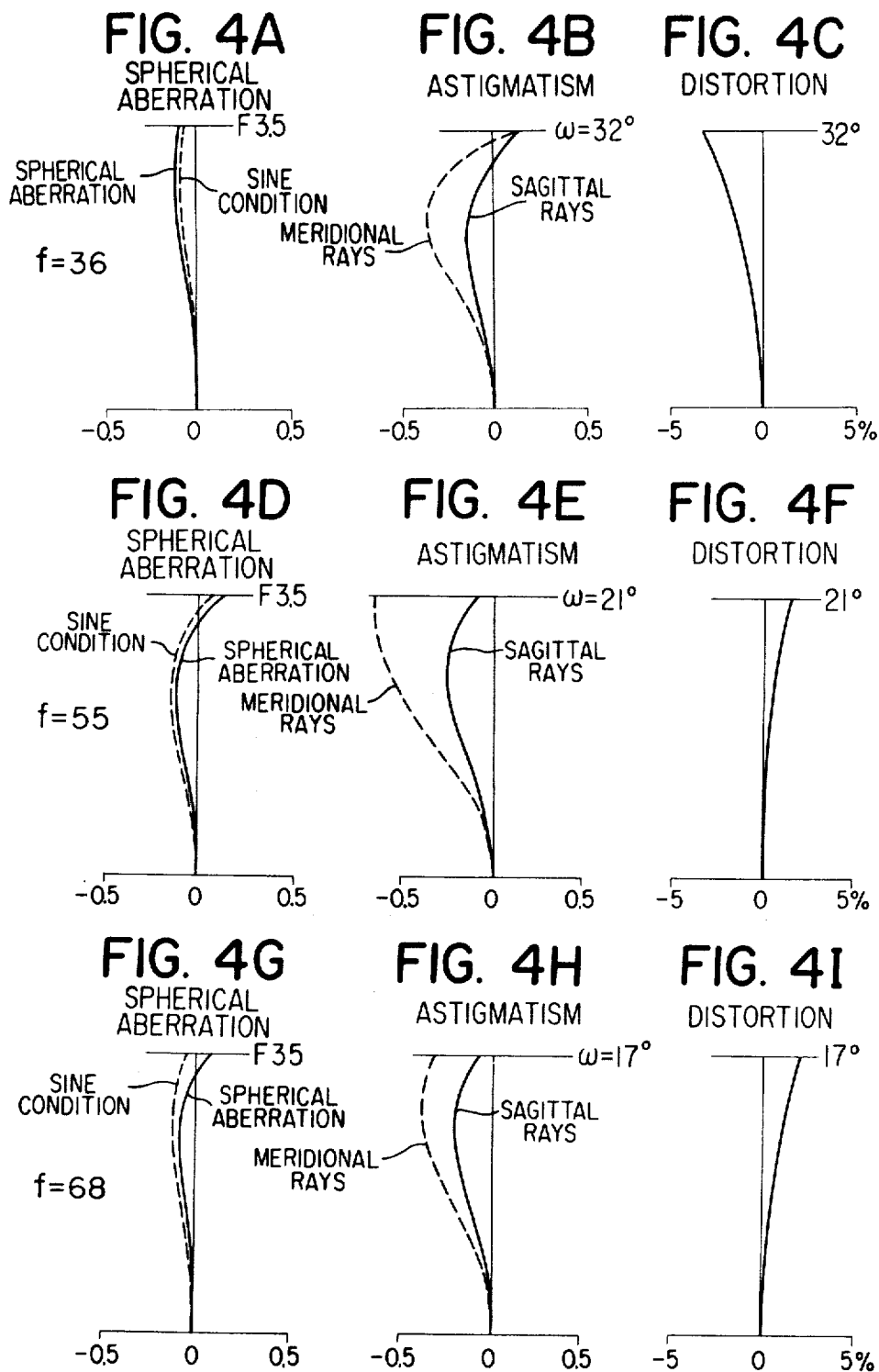

WIDE ANGLE ZOOM LENS OF TWO-GROUP CONSTRUCTION

BACKGROUND OF THE INVENTION

1. Field of the Invention

This invention relates to improvements in a zoom lens, and specifically to improvements in the zoom lens disclosed in Japanese Laid-open Patent application No. 135750/1977 (U.S. Pat. No. 4,155,629).

2. Description of the Prior Art

In a zoom lens comprising a forward group which is a divergent lens group and a rearward group which is a convergent lens group as a zoom lens covering a wide angle of view, correction of various aberrations and correction of the fluctuations of the various aberrations caused by zooming are of course important, but making the entire lens system compact for simplicity of the mechanism has been a matter of concern. According to the prior art, it is disclosed in Japanese Laid-open Patent application No. 135658/1978 that the total length of the lens system is minimum when the focal length of the entire system becomes equal to the absolute value of th focal length of the divergent lens group and that the total length increases when the focal length of the entire system is longer or shorter than said absolute value. Therefore, in Japanese Laid-open Patent application No. 132360/1978, it is described as the condition for compactness of a lens system that the absolute value of the focal length of the divergent lens group is set within the range of the focal length over which the focal length of the entire system is varied by zooming, or to a value very approximate to the focal length of the entire system at the telephoto end. However, such lens system is generally designed as a lens system which covers a relatively short focal length range and the focal length of the entire system at the telephoto end is not so long. Therefore, the power of the divergent lens group therefore has unavoidably become considerably strong. To eliminate the burden in aberration correction which results therefrom, such lens system has adopted means for thickening each lens group and thus, it may not safely be said that the effect of making the lens system compact has been achieved so well.

SUMMARY OF THE INVENTION

It is an object of the present invention to reduce such a burden in aberration correction and thereby provide a lens system having a high zoom ratio and a large angle of view of 64° which is compact and yet excellent in performance.

The invention will become fully apparent from the following detailed description thereof taken in conjunction with the accompanying drawings.

BRIEF DESCRIPTION OF THE DRAWINGS

FIGS. 3A-3I and 4A-4I illustrate the aberrations in the first and second embodiments, respectively.

DESCRIPTION OF THE PREFERRED EMBODIMENTS

Figure 1:
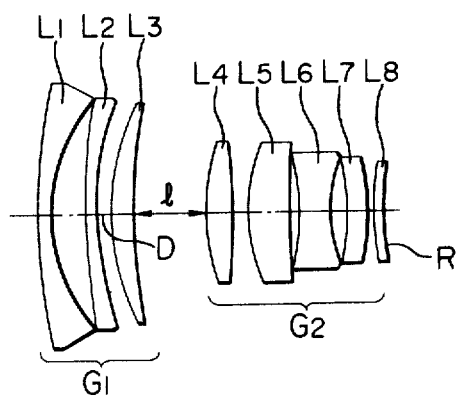
FIGS. 1 and 2 are cross-sectional views of the lens system according to first and second embodiments of the present invention.

In Japanese Laid-open Patent application No. 135750/1977 (U.S. Pat. No. 4,155,629), the condition that $$0.1 < \frac{d}{|FA|} < 0.25 \quad (A)$$

where FA is the focal length of the divergent lens group has been imposed on the air space d between a first negative lens component and a first positive meniscus lens component of the divergent lens group, whereby correction of the fluctuations of spherical aberration and curvature of image field has been made possible and at the same time, compactness of the lens system has been achieved. However, as the result of the embodiment described in Japanese Laid-open Patent application No. 135750/1977 (U.S. Pat. No. 4,155,629) having been considered, it has been found that the lens system is made compact in spite of the relatively great air space between the first negative lens component and the first positive meniscus lens component of the divergent lens group, and it has also been foreseen that there is a possibility of making the lens system more compact if this air space can be reduced beyond the lower limit of condition (A). That is, the remarkable spherical aberration or curvature of image field generated when d is made small is due to the strong negative power borne by the divergent lens group, and if the power of the divergent lens group was weakened to reduce the burden thereof in the correction of the aberrations, it would be possible to make the lens thinner. What has been a matter of concern in this case is the variation in total length caused by weakening the power of the divergent lens group and if the full length is too great, it would possibly offset the effect of the decreased thickness of the lens resulting from making the divergent lens group thinner. Therefore, the following mathematical consideration has been made about the variation in total length. With the focal length of the divergent lens group being $F_1$, the focal length of the convergent lens group being $F_2$, the spacing between the principal points of the two lens groups at the telephoto end being DP, the focal length of the entire system at the telephoto end being F, and the back focal length in the power arrangement of the entire system at the telephoto end being BF, the variation in the partial space with $F_2$ and F being constant for the full length L and with $F_1$ as the parameter has been followed up. DP and BF are expressed by the following equations.

$$DP = F_1 + F_2 - \frac{F_1 \cdot F_2}{F}$$

$$BF = F_2 - \frac{F_2 \cdot F}{F_1}$$

If these are partial-differentiated with respect to $F_1$, the following is obtained:

$$\left(\frac{\delta DP}{\delta F_1}\right) F_2, F = 1 - \frac{F_2}{F} \quad 1$$

$$\left(\frac{\delta BF}{\delta F_1}\right) F_2, F = \frac{F_2 \cdot F}{F_1^2} \quad 2$$

Since the full length L is given by $$L = DP + BF,$$

the following is obtained for the variation in L.

$$\left(\frac{\delta L}{\delta F_1}\right) F_2, F = \left(\frac{\delta DP}{\delta F_1}\right) F_2, F + \left(\frac{\delta BF}{\delta F_1}\right) F_2, F \quad 3$$

From equations 1, 2 and 3, in a lens system wherein $$1 - \frac{F_2}{F} > 0, \left(\frac{\delta DP}{\delta F_1}\right) F_2 F > 0, \left(\frac{\delta BF}{\delta F_1}\right) F_2, F > 0,$$

$$\left(\frac{\delta L}{\delta F_1}\right) F_2, F > 0.$$

It will thus be found that if the absolute value of $F_1(<O)$ is increased, all of the full length L, the spacing DP and the back focal length BF are monotonically decreased. This result shows that in a lens system wherein $1 - F_2/F > 0$, if the power of the divergent lens group is weakened for the same focal length, the total length is monotanically decreased. That is, from the fact that the total length becomes minimum when the absolute value of the focal length of the divergent lens group is equal to the focal length of the entire system, there is derived a condition for compactness which differs from the conventional condition that it is preferable to set the focal length of the divergent lens group to the focal length of the zooming range or approximately thereto.

Thus, the greatest feature of the present invention is that the following two effects are created simultaneously by weakening the power of the divergent lens group. One effect is the reduction in total length resulting from reducing the burden of correcting the aberrations and making the divergent lens group thinner, and the other effect is the reduction in total length in the power arrangement. Therefore, specifically, it is necessary that the focal length of the divergent group be 1.12 times the total focal length of the entire system at the telephoto end, or more. Accordingly, the present invention consists in a zoom lens system comprising, in succession from the object side, a divergent lens group and a convergent lens group, the magnification of the lens system being changed by relative movement of the two groups, the absolute value of the focal length of the divergent lens group being greater than 1.12 times the total focal length of the entire system at the telephoto end, and wherein the divergent lens group has only one positive lens, the lens system satisfying the following conditions:

$$\frac{D}{|f_1|} < 0.1 \quad (I)$$

$$0 < \frac{1}{R} < \frac{2.5}{|f_1|} \quad (II)$$

where D is the air space between the positive lens and the lens immediately before the positive lens, $f_1$ is the focal length of the divergent lens group, and R is the curvature radius of the surface which is most adjacent to the image side in the convergent lens group.

Specifically, if the absolute value of the focal length of the divergent lens group is of the order of 1.12 times the focal length of the entire system at the telephoto end, D can be made small to well correct the aberrations while realizing the compactness. However, if D is made small as shown in condition (I), the effect of correction of distortion by the positive lens in the divergent lens group will be reduced and therefore, it will be indispensable to provide the convergent lens group also with an effect of distortion correction by condition (II). As regards condition (I), if the upper limit thereof is exceeded, the total length will be increased and the diameter of a filter will also become greater. As regards condition (II), if the upper limit thereof is exceeded, over-correction of distortion and spherical aberration will result and if the lower limit thereof is exceeded, a concave surface will be provided on the object side to reduce the effect of distortion correction in the rearward group and make good aberration correction difficult.

In a zoom lens like that of the present invention wherein magnification change is effected by moving the divergent lens group and the convergent lens group, it is apparent that the lens can easily be made compact if the zoom ratio is made small, and by the present invention, the power of the divergent lens group is weakened to shorten the total length in the power arrangement and satisfy conditions (I) and (II) at a time, whereby there may be obtained a lens system having a high zoom ratio and yet compact and excellent in performance.

Embodiments of the present invention will now be described. In a first embodiment whose lens arrangement is shown in FIG. 1, the divergent lens group $G_1$ comprises, in succession from the object side, two negative meniscus lenses $L_1$ and $L_2$ having their convex surfaces facing the object side and a positive meniscus lens $L_3$ having its convex surface facing the object side, and the convergent lens group $G_2$ comprises, in succession from the object side, a biconvex positive lens $L_4$ having its surface of sharper curvature facing the object side, a positive lens $L_5$ having its surface of sharper curvature facing the object side, a biconcave negative lens $L_6$ having its surface of sharper curvature facing the image side, a positive meniscus lens $L_7$ having its convex surface facing the image side, and a positive meniscus lens $L_8$ having its convex surface facing the object side. Where the lens system of the first embodiment is used in the focal length range of 37 mm to 69 mm as a lens for 35 mm single lens reflex camera, the absolute value of the focal length of the divergent lens group is 83.3 mm and the total length at the telephoto end is 105.3 mm, and also it permits a filter of diameter 48 mm mounted on the object side to be used without being kicked over the entire zooming range.

Figure 2:
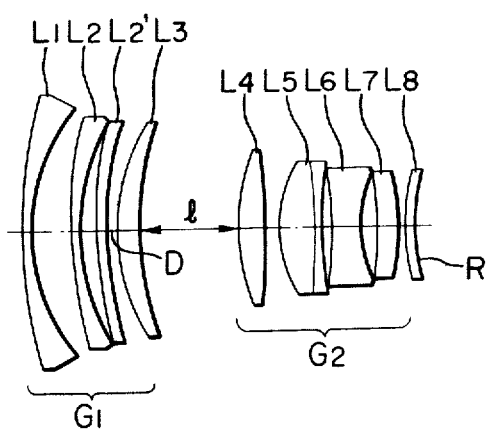

In a second embodiment whose lens arrangement is shown in FIG. 2, the divergent lens group $G_1$ comprises, in succession from the object side, three negative meniscus lenses $L_1$, $L_2$ and $L'_2$ having their convex surfaces facing the object side and a positive lens $L_3$ having its convex surface facing the object side, and the convergent lens group $G_2$ comprises, in succession from the object side, a biconvex positive lens $L_4$ having its surface of sharper curvature facing the object side, a doublet positive lens $L_5$ having its surface of sharper curvature facing the object side, a biconcave negative lens $L_6$ having its surface of sharper curvature facing the image side, a positive meniscus lens $L_7$ having its convex surface facing the image side, and a positive meniscus lens $L_8$ having its convex surface facing the object side. Where the lens system of the second embodiment is used in the focal length range of 36 mm to 68 mm as a lens for 35 mm single lens reflex camera, the absolute value of the focal length of the divergent lens group is 81.04 mm and the total length at the telephoto end is 104.5 mm, and also it permits a filter of diameter 48 mm mounted on the object side to be used without being kicked over the entire zooming range.

Numerical data in the two embodiments will be shown below. In the tables below, r represents the curvature radius of each lens surface, d represents the center thicknesses and air spaces of the successive lenses, ν and n represent the Abbe number and refractive index, respectively, of each lens, f represents the focal length of the entire system, and l represents the air space between the forward group and the rearward group. The numbers at the left end of the tables represent the order from the object side.

Various aberrations in the shortest, medium and longest focal length conditions of the respective embodiments are illustrated in FIGS. 3 and 4.

First Embodiment

| | r | d | ν | n |
|---|---|---|---|---|
| 1 | 108.5 | 2.5 | 39.5 | 1.80454 |
| 2 | 30.253 | 5.5 | | |
| 3 | 115.83 | 1.6 | 44.9 | 1.744 |
| 4 | 49.749 | 2.6 | | |
| 5 | 38.3 | 4.1 | 28.4 | 1.79504 |
| 6 | 117.05 | 1 | | |
| 7 | 33.125 | 4.2 | 60.3 | 1.62041 |
| 8 | −159.7 | 2.65 | | |
| 9 | 26.82 | 7 | 60.3 | 1.62041 |
| 10 | 131.5 | 1.15 | | |
| 11 | −70.1 | 5.7 | 28.4 | 1.79504 |
| 12 | 22.088 | 3.15 | | |
| 13 | −49.749 | 3.9 | 40.8 | 1.79631 |
| 14 | −27.45 | 0.1 | | |
| 15 | 63.03 | 2 | 40.8 | 1.79631 |
| 16 | 136.434 | | | |

F - No. 3.5
f = 37–69
2w = 62°-34°
l = 41.4–0.1

Second Embodiment

| | r | d | ν | n |
|---|---|---|---|---|
| 1 | 98.38 | 1.5 | 38.3 | 1.65128 |
| 2 | 31 | 4 | | |
| 3 | 68.274 | 1.6 | 55.6 | 1.6968 |
| 4 | 35.7 | 2.6 | | |
| 5 | 63.36 | 1.6 | 40.8 | 1.79631 |
| 6 | 54.8 | 2.5 | | |
| 7 | 35.21 | 4 | 28.4 | 1.79504 |
| 8 | 73.869 | 1 | | |
| 9 | 39.2 | 4.1 | 60.3 | 1.62041 |
| 10 | −131.135 | 2.6 | | |
| 11 | 22.305 | 6.05 | 60.3 | 1.62041 |
| 12 | −170 | 1.25 | 35.6 | 1.62588 |
| 13 | 82.75 | 1.1 | | |
| 14 | −111.578 | 5.35 | 34 | 1.79886 |
| 15 | 19.3 | 3.05 | | |
| 16 | −44.728 | 3.9 | 60.3 | 1.62041 |
| 17 | −23.5 | 0.1 | | |
| 18 | 36.254 | 1.95 | 41.9 | 1.66755 |
| 19 | 61.695 | | | |

F - No. 3.5
f = 36–68
2w = 64°-34.7°
l = 46.6–0.4

I claim:

1. In a wide angle zoom lens system which comprises, in succession from the object side, a divergent lens group and a convergent lens group and in which magnification change is effected by relative movement of said two groups and the absolute value of the focal length of said divergent lens group is greater than 1.12 times the longest total focal length of the entire system, the improvement residing in that said divergent lens group includes, in succession from the object side, at least two negative meniscus lenses having their convex surfaces facing the object side and only one positive meniscus lens having its convex surface facing the object side, and that said lens system satisfies the following conditions:

$$\frac{D}{|f_1|} < 0.1 \quad (I)$$

$$0 < \frac{1}{R} < \frac{2.5}{|f_1|} \quad (II)$$

where D is the air space between said positive meniscus lens and the negative meniscus lens immediately before said positive meniscus lens, $f_1$ is the focal length of said divergent lens group, and R is the curvature radius of the surface of said convergent lens group which is most adjacent to the image side.

2. A wide angle zoom lens system according to claim 1, wherein said convergent lens group has, in succession from the object side, a biconvex positive lens having its surface of sharper curvature facing the object side, a single or doublet positive lens having its surface of sharper curvature facing the object side, a biconcave negative lens having its surface of sharper curvature facing the image side, a positive meniscus lens having its convex surface facing the image side, and a positive meniscus lens having its convex surface facing the object side.

3. A wide angle zoom lens system comprising, in succession from the object side, a divergent lens group and a convergent lens group, a magnification change being effected by relative movement of said two groups and the absolute value of the focal length, $f_1$, of said divergent lens group being greater than 1.12 times the longest total focal length, f, of the entire system, said divergent lens group including, in succession from the object side, at least two negative meniscus lenses and only one positive meniscus lens, and said lens system satisfying the following conditions:

$$\frac{D}{|f_1|} < 0.1 \quad (I)$$

$$0 < \frac{1}{R} < \frac{2.5}{|f_1|} \quad (II)$$

where D is the air space between said positive meniscus lens and the negative meniscus lens immediately before said positive meniscus lens, and R is the radius of curvature of the lens surface of said convergent lens group which is most adjacent to the image side, and wherein numerical data for the lenses, in order from the object side, are as follows:

| | r | d | ν | n |
|---|---|---|---|---|
| 1 | 108.5 | 2.5 | 39.5 | 1.80454 |
| 2 | 30.253 | 5.5 | | |
| 3 | 115.83 | 1.6 | 44.9 | 1.744 |
| 4 | 49.749 | 2.6 | | |
| 5 | 38.3 | 4.1 | 28.4 | 1.79504 |
| 6 | 117.05 | 1 | | |
| 7 | 33.125 | 4.2 | 60.3 | 1.62041 |

-continued

|    | r       | d    | ν    | n       |
|----|---------|------|------|---------|
| 8  | −159.7  | 2.65 |      |         |
| 9  | 26.82   | 7    | 60.3 | 1.62041 |
| 10 | 131.5   | 1.15 |      |         |
| 11 | −70.1   | 5.7  | 28.4 | 1.79504 |
| 12 | 22.088  | 3.15 |      |         |
| 13 | −49.749 | 3.9  | 40.8 | 1.79631 |
| 14 | −27.45  | 0.1  |      |         |
| 15 | 63.03   | 2    | 40.8 | 1.79631 |
| 16 | 136.434 |      |      |         |

F - No. 3.5
f = 37–69
2w = 62°–34°
l = 41.4–0.1 where r represents the radius of curvature of each lens surface, d represents the center thicknesses and airspaces of the successive lens, ν and n represent the Abbe number and refractive index, respectively, of each lens, 2w represents the angle of view, and l represents the air space between the forward group and the rearward group.

4. A wide angle zoom lens system comprising, in succession from the object side, a divergent lens group and a convergent lens group, a magnification change being effected by relative movement of said two groups and the absolute value of the focal length, $f_1$, of said divergent lens group being greater than 1.12 times the longest total focal length, f, of the entire system, said divergent lens group including, in succession from the object side, at least two negative meniscus lenses and only one positive meniscus lens, and said lens system satisfying the following conditions:

$$\frac{D}{|f_1|} < 0.1 \quad (I)$$

$$0 < \frac{1}{R} < \frac{2.5}{|f_1|} \quad (II)$$

where D is the air space between said positive meniscus lens and the negative meniscus lens immediately before said positive meniscus lens, and R is the radius of curvature of the lens surface of said convergent lens group which is most adjacent to the image side, and wherein numerical data for the lenses, in order from the object side, are as follows:

|    | r        | d    | ν    | n       |
|----|----------|------|------|---------|
| 1  | 98.38    | 1.5  | 38.3 | 1.65128 |
| 2  | 31       | 4    |      |         |
| 3  | 68.274   | 1.6  | 55.6 | 1.6968  |
| 4  | 35.7     | 2.6  |      |         |
| 5  | 63.36    | 1.6  | 40.8 | 1.79631 |
| 6  | 54.8     | 2.5  |      |         |
| 7  | 35.21    | 4    | 28.4 | 1.79504 |
| 8  | 73.869   | 1    |      |         |
| 9  | 39.2     | 4.1  | 60.3 | 1.62041 |
| 10 | −131.135 | 2.6  |      |         |
| 11 | 22.305   | 6.05 | 60.3 | 1.62041 |
| 12 | −170     | 1.25 | 35.6 | 1.62588 |
| 13 | 82.75    | 1.1  |      |         |
| 14 | −111.578 | 5.35 | 34   | 1.79886 |
| 15 | 19.3     | 3.05 |      |         |
| 16 | −44.728  | 3.9  | 60.3 | 1.62041 |
| 17 | −23.5    | 0.1  |      |         |
| 18 | 36.254   | 1.95 | 41.9 | 1.66755 |
| 19 | 61.695   |      |      |         |

F - No. 3.5
f = 36–68
2w = 64°–34.7°
l = 46.6–0.4 where r represents the radius of curvature of each lens surface, d represents the center thicknesses and air spaces of the successive lenses, ν and n represent the Abbe number and refractive index, respectively, of each lens, 2w represents the angle of view, and l represents the air space between the forward group and the rearward group.

* * * * *